United States Patent [19]

Koebler

[11] Patent Number: 5,316,262
[45] Date of Patent: May 31, 1994

[54] FLUID RESTRICTOR APPARATUS AND METHOD FOR MAKING THE SAME

[75] Inventor: Douglas J. Koebler, Irwin, Pa.
[73] Assignee: Suprex Corporation, Pittsburgh, Pa.
[21] Appl. No.: 828,729
[22] Filed: Jan. 31, 1992
[51] Int. Cl.$^5$ ............................................. F16K 7/06
[52] U.S. Cl. ...................................... 251/8; 138/46; 137/13; 137/828
[58] Field of Search ................... 251/8, 4, 7; 138/45, 138/46, 30, 39, 40, 43; 137/828, 13

[56] References Cited
U.S. PATENT DOCUMENTS 4,271,099  6/1981  Kukla ............................... 138/40 X
4,787,406  11/1988 Edwards et al. ..................... 251/8 X

FOREIGN PATENT DOCUMENTS 416228   8/1925  Fed. Rep. of Germany ........ 138/40
582032  11/1946  United Kingdom ................... 251/8

Primary Examiner—A. Michael Chambers
Assistant Examiner—Kevin L. Lee
Attorney, Agent, or Firm—Ansel M. Schwartz

[57] ABSTRACT

The present invention is an apparatus for restricting the flow of fluid. The apparatus defines a tubular member having a channel. The tubular member has a first portion in which the channel has a first cross sectional area. There is also a second portion for restricting the flow of fluid defined by a reproducible deformity in the channel such that the channel has a second cross sectional area which is smaller than the first cross sectional area of the first portion. The tubular member further defines a third portion having a third cross sectional area which is greater than the second cross sectional area of the second portion. All of the cross sectional dimensions of the second and third portions are disposed within a cylindrical envelope having a diameter equal to the diameter of the first portion and extending therefrom. The tubular member is comprised of a material having sufficient rigidity to maintain a preferred reproducible permanent deformity in the channel. Portion has an essentially constant outside diameter and wherein all cross sectional dimensions of the tubular member are less than or equal to the diameter of the first portion and all of the cross sectional dimensions of the second and third portions are disposed within a cylindrical envelope having a diameter equal to the diameter of the first portion and extending therefrom. Preferably, the deformity is defined by a spherical indentation and the tubular member is comprised of stainless steel. The present invention is also a method of forming a fluid restrictor comprising the steps of first placing a tubular member having a channel and a predetermined outside diameter into a fixed relationship with a deforming apparatus. Then, there is the step of deforming the tubular member in a reproducible manner such that a cross sectional area of the channel is decreased so flow of fluid through the channel is restricted a desired amount. The deforming step does not cause the tubular member to flare and all of the cross sectional dimensions of the second and third portions disposed within a cylindrical envelope having a diameter equal to the diameter of the first portion and extending therefrom. Preferably, the deforming step includes the step of forcing a shaping element of the deforming apparatus against the tubular member. Alternatively, the deforming apparatus can be used to adjust the magnitude of fluid restriction during operation of the fluid restrictor.

36 Claims, 3 Drawing Sheets

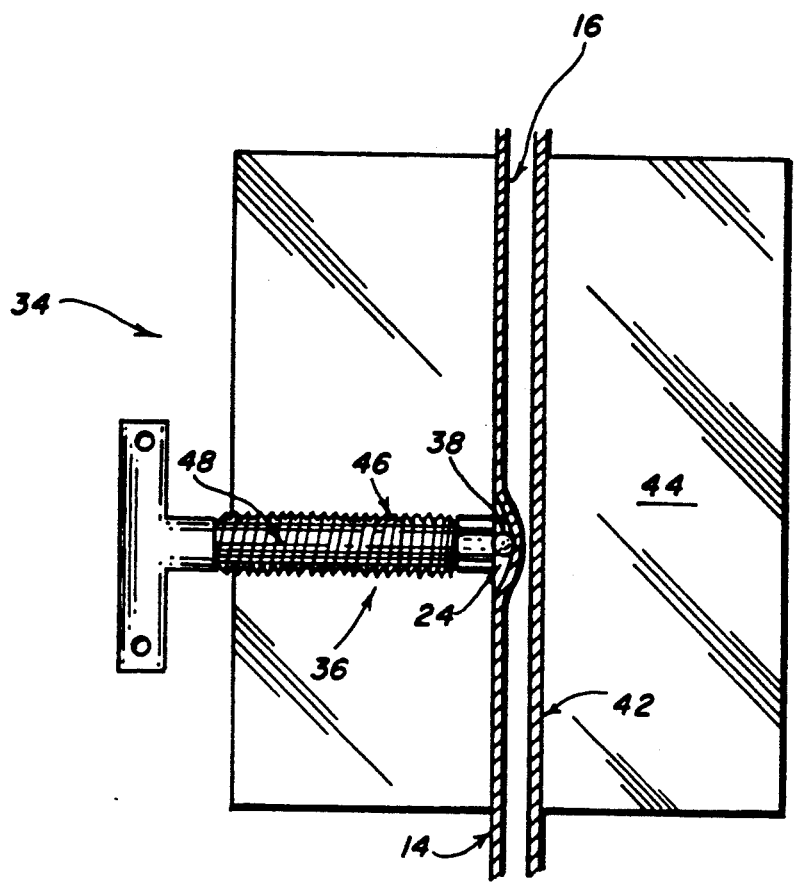
FIG. 3
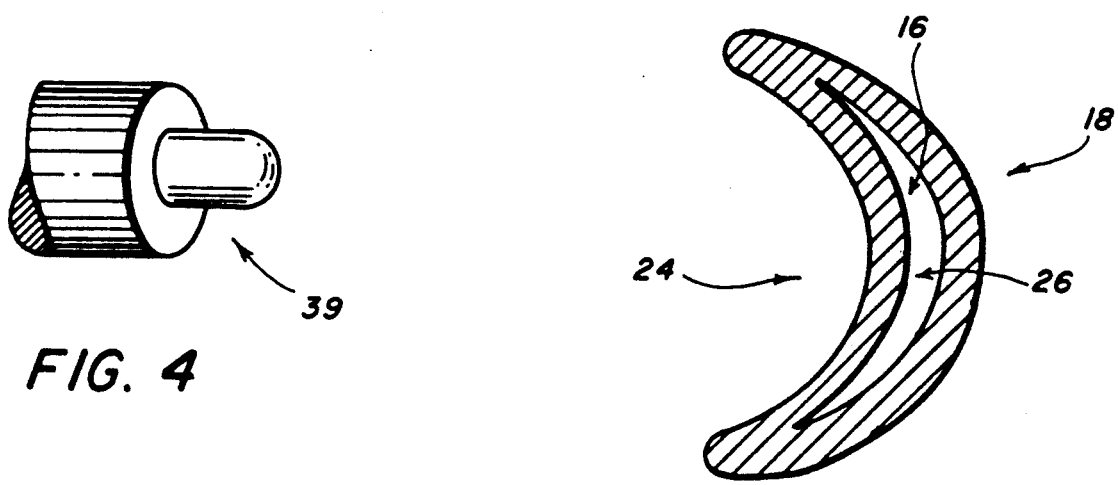
FIG. 4
FIG. 2

FLUID RESTRICTOR APPARATUS AND METHOD FOR MAKING THE SAME

FIELD OF THE INVENTION

The present invention is related in general to fluid restrictors. More specifically, the present invention is related to a tubular fluid restrictor having a reproducible deformity and non-flaring walls.

BACKGROUND OF THE INVENTION

It is known in the art of high pressure fluid or supercritical fluid restrictors to restrict the flow of fluid with fluid restrictors instead of valves because the fluid flow rates, which can be in the range of 10 microliters/min. to 10 ml/min., are too low for accurate and reproducible flow control by conventional valves.

In one type of fluid restrictor, holes are formed in a circular disc that are supported in the path of the flowing fluid by the necessary hardware, seals and fittings.

A problem exists with such fluid restrictors in that the small size of the hole and its abrupt change in cross sectional area allow it to become clogged easily. This is an undesirable event in that it typically entails dismounting the fluid restrictor so that it can be cleaned or replacing it altogether.

It is also known to use linear fused silica tubing having a small internal channel as a fluid restrictor. Tapered fused silica restrictors are also formed by heating and drawing out the fused silica tubing until the internal channel is the appropriate dimension. (T. L. Chester, D. P. Innis, G. D. Owens, Analytical Chemistry, 57 (1985) 2243-2247).

"Integral" fused silica restrictors (E. J. Guthrie, H. E. Schwartz, J. Chromatographic Science, 24 (1986) 236-241) are formed by heating the end of the fused silica tubing until it melts shut. Then, sending away the end until a small hole is formed Ceramic frits have also been formed at the ends of the fused silica restrictor (K. E. Morkides, S. M. Fields, M. L. Lee, J. Chromatographic Science, 24 (1986) 254-257). A review of restrictors is given by B. W. Wright, R. D. Smith, "Restrictor Performance Characteristics for SFC", Chapter 10 of Book Modern Supercritical Fluid Chromatography, Ed C. M. White, Dr. Alfred Huthig Verlag, ISBN 3-7785-1569-1, 1988.

A length of fused silica tubing does better as a restrictor than a hole in a disc as it plugs less often, but it is limited by other deficiencies including 1) it is brittle and can break easily, 2) one must use a long length, typically 10 to 100 centimeters which makes its use inconvenient to the user, and 3) since the tube is glass, it is a poor thermal insulator and thus it is difficult to heat. Heat has been shown to reduce clogging in fluid restrictors.

Fluid restrictors have also been constructed by crimping a stainless steel or platinum tube with pliers to deform the wall thereby decreasing the cross sectional area of the channel within. Though such restrictors are less prone to clogging, the pliers cause the outer diameter of the wall to become greater than its original value in places. This flaring of the tube prevents a snug fit in the appropriate fittings. Thus, efficient heat transfer is limited. A further problem exists in that it is difficult if not impossible to reproduce the shape or profile of the deformity. This limits the accuracy in predicting the magnitude of fluid restriction and the aversion to clogging.

The present invention provides a fluid restrictor wherein the wall is deformed such that the channel within is restricted without flaring of the walls and the deformity is reproducible. The operation of these restrictors occurs at temperatures of 50° C. to 250° C. to further reduce clogging.

SUMMARY OF THE INVENTION

The present invention is an apparatus for restricting the flow of fluid. The apparatus defines a tubular member having a channel. The tubular member has a first portion in which the channel has a first cross sectional area. There is also a second portion for restricting the flow of fluid defined by a reproducible deformity in the channel such that the channel has a second cross sectional area which is smaller than the first cross sectional area of the first portion. The tubular member further defines a third portion having a third cross sectional area which is greater than the second cross sectional area of the second portion. The first portion has an essentially constant outside diameter and wherein essentially all cross sectional dimensions of the tubular member are less than or equal to the diameter of the first portion. All of the cross sectional dimensions of the second and third portions are disposed within a cylindrical envelope having a diameter equal to the diameter of the first portion and extending therefrom. The tubular member is comprised of a material having sufficient rigidity to maintain a preferred reproducible permanent deformity in the channel. Preferably, the deformity is defined by a spherical indentation and, the tubular member is comprised of stainless steel. Alternatively, the deformity can be defined by a plurality of indentations.

The present invention is also a method of forming a fluid restrictor comprising the steps of first placing a tubular member having a channel and a predetermined outside diameter into a fixed relationship with a deforming apparatus. Then, there is the step of deforming the tubular member in a reproducible manner such that a cross sectional area of the channel is decreased so flow of fluid through the channel is restricted a desired amount. The deforming step does not cause the tubular member to flare and all of the cross sectional dimensions of the second and third portions are disposed within a cylindrical envelope having a diameter equal to the diameter of the first portion and extending therefrom. Preferably, the deforming step includes the step of forcing a shaping member of the deforming apparatus against the tubular member.

In a preferred embodiment, the forcing step includes the step of pressing the shaping member against the tubular member in an adjustable manner. The shaping member can include a ball bearing or a shaped head. The deforming apparatus can also be used to control the magnitude of fluid restriction during the operation of the fluid restrictor.

BRIEF DESCRIPTION OF THE DRAWINGS

In the accompanying drawings, the preferred embodiment of the invention and preferred methods of practicing the invention are illustrated in which:

FIG. 2 shows a cross sectional view of the fluid restrictor at the deformity.

FIG. 3 shows a cross sectional view of the shaping apparatus.

FIG. 4 shows a perspective view of a shaped head.

DESCRIPTION OF THE PREFERRED EMBODIMENT

Figure 1:
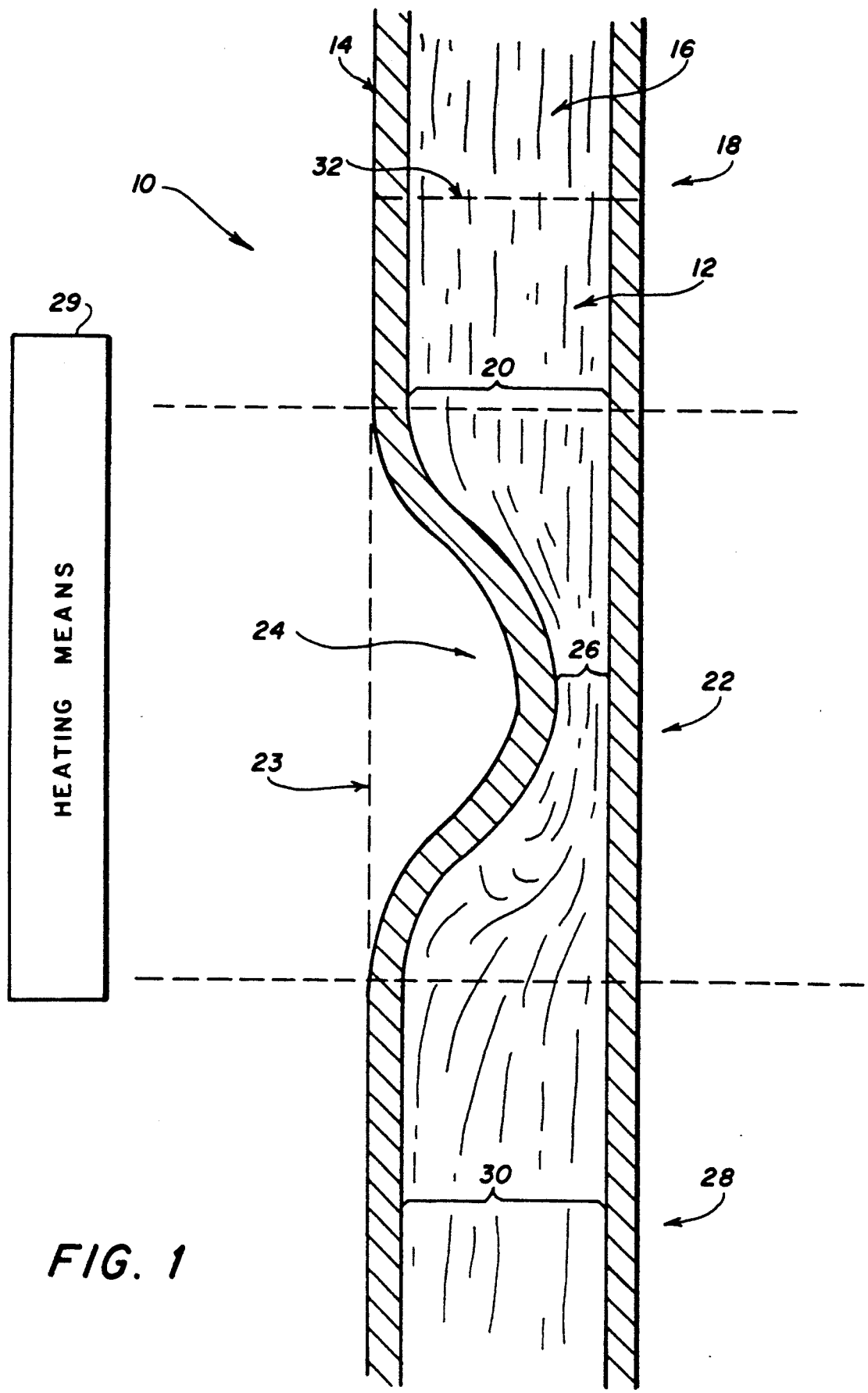
FIG. 1 shows a cross sectional view along the length of the fluid restrictor.
Figure 5:
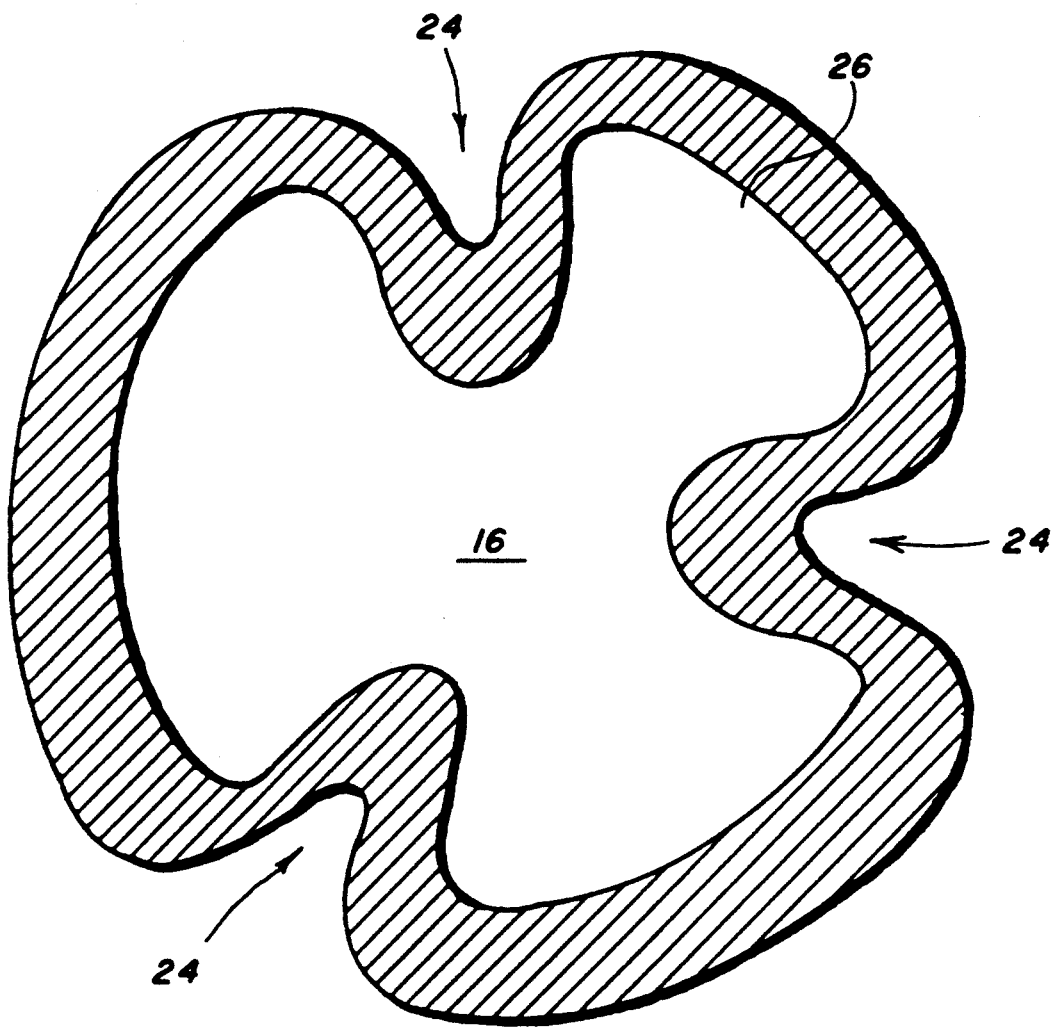
FIG. 5 shows a cross sectional view of an alternative embodiment of the restrictor having a plurality of indentations.

Referring now to the drawings wherein like reference numerals refer to similar or identical parts throughout the several views, and more specifically to FIGS. 1 and 2 thereof, there is shown an apparatus 10 for restricting the flow of fluid 12. The apparatus 10 is comprised of a tubular member 14 having a channel 16. The tubular member 14 has a first portion 18 in which the channel 16 has a first cross sectional area 20. There is also a second portion 22 for restricting the flow of fluid 12 defined by a reproducible deformity 24 in the channel 16 such that the channel 16 has a second cross sectional area 26 which is smaller than the first cross sectional area 20 of the first portion. The tubular member 14 further defines a third portion 28 having a third cross sectional area 30 which is greater than the second cross sectional area 26 of the second portion 22. The first portion 18 has essentially a constant outside diameter, represented by line 32 wherein all cross sectional dimensions of the tubular member 14 are less than or equal to the diameter of the first portion 18. All of the cross sectional dimensions of the second and third portions are disposed within a cylindrical envelope having a diameter equal to the diameter of the first portion and extending therefrom. The tubular member is comprised of a material having sufficient rigidity to maintain a preferred reproducible permanent deformity in the channel. Preferably, the deformity 24 is defined by a spherical indentation, the tubular member is comprised of stainless steel, and the first portion 18 is in contact with the second portion 22, and the second portion 22 is in contact with the third portion 28. Heating means 29, such as a sensitive heater, can be in thermal communication with the tubular member 14.

The present invention, as shown in FIG. 3, is also a method of forming a fluid restrictor comprising the steps of first placing a tubular member 14 having a channel 16 and a predetermined outside diameter into a fixed relationship with a deforming apparatus 34. Then, there is the step of deforming the tubular member 14 in a reproducible manner such that a cross sectional area of the channel 16 is decreased so flow of fluid 12 through the channel 16 is restricted a desired amount. The deforming step does not cause the tubular member 14 to flare and all portions of the tubular member are disposed within a cylindrical envelope defined by the outside diameter. Then, there is the step of removing the tubular member from the deforming apparatus such that a desired deformation remains in the tubular member. Preferably, the deforming step includes the step of forcing a shaping member 36 of the deforming apparatus 34 against the tubular member 14.

In a preferred embodiment, the forcing step includes the step of pressing the shaping member 36 against the tubular member 14 in an adjustable manner. The shaping member 36 can include a ball bearing 38 or a shaped head 39 as shown in FIG. 4.

In the operation of the invention, the tubular member 14 is formed from a stainless steel tube having an outside diameter of $\frac{1}{8}$ of an inch and a length of 2 centimeters. The channel 16 originally has a uniform diameter of 0.01 inches. The tube is placed within a holding slot 42 formed in the body 44 of the deforming apparatus 34. A threaded hole 46 extends through the body 44 and intersects the holding slot 42 of the body 44 in a perpendicular relationship. A threaded shaft 48 is threadingly engaged through the threaded hole 46. The threading of the threaded hole and shaft 46, 48 is very fine so that the displacement of the shaft 48 within the hole 46 can be precisely controlled. The shaft and body 48, 44 are comprised of stainless steel to prevent corrosion and provide material strength.

The first portion 18 of the tube is placed in fluidic communication with a source of pressurized fluid. The fluid flows through the channel 16 and exits from the third portion 28 of the tube where the level of fluid restriction is monitored. Once flow has been established in the tube, the threaded shaft 48 is turned such that it forces a 1/16" diameter stainless steel ball bearing 38 into the tube. The ball bearing 38 can be smaller than 1/16" diameter but it has been shown in practice that ball bearings larger than 1/16" diameter cause flaring of the tubular member 14 having an outside diameter of $\frac{1}{8}$". Flaring is undesirable in that it prevents the tubular member 14 from fitting into close tolerance fittings.

As the ball bearing 38 is forced into the tube, the channel 16 at that point is deformed thereby reducing its cross sectional area. This reduction in cross sectional area acts to restrict the flow of fluid, the effect of which is continually monitored. Once the desired level of fluid restriction is attained, the shaft 48 is turned another $\frac{1}{4}$ turn to counteract for the elasticity of the tubes stainless steel walls.

Typical fluid restriction levels cause the pressure within the channel to drop from 400 atmospheres upstream of the deformity 24 to a pressure of 1 atmospheres downstream of the deformity 24 at a flow rate of 2 to 4 ml/min. of carbon dioxide. The width of the second cross sectional area 26 necessary for this level of fluid restriction is on the order of 10 microns equal to 0.01 mm.

The deformity of the tubular member 14 formed by this manner, as shown in FIG. 2, is reproducible and controllable thereby allowing the flow characteristics of the fluid to be predictable. Further, the rounded shape of the deformity 24 provides no abrupt cross sectional area changes which have been shown to contribute to clogging. Rather, the reproducible deformity 24 of the tubular member 14 acts to channel particles into and past the smallest cross sectional area.

Once formed, the tubular member 14 is removed from the deforming apparatus 34 and is fitted into a ferrule having an opening which closely matches the outside diameter of the tubing. The deformity 24 of the tubular member 14 does not cause flaring and therefore allows the tubular member 14 to fit closely with the ferrule. This close tolerance fit essentially allows metal to metal contact which in turn allows for efficient heat transfer between the ferrule and tubular member 14. Also, the lack of flaring allows the tube 14 to be fitted into a tight tolerance heated enclosure which maximizes the amount of heat transfer into the restrictor.

Alternatively, the tubular member 14 can be maintained within a deforming apparatus 34 during its operation. In this manner, the deforming apparatus 34 can be used as adjustable control means to alter the cross sectional area of the channel 16. The elasticity of the stainless steel tubular member 14 allows the channel 16 to open as the deforming apparatus is loosened. This opening of the channel 16 can be used to clear the channel 16 of any blockage or can be used simply to decrease the fluid restriction. Preferably, the tubular member 14 is heated to 250° C. during operation to reduce clogging of the channel 16. The pressurized fluid 12 is preferably supercritical $CO_2$ and can be mixed with modifiers. The modifiers are organic solvents and can consist of methanol, ethanol, polypropylene carbonate, or formic acid, but is not limited thereto.

Alternatively, other tubing, such as poly ether ether ketone, other plastics or other metals, such as platinum, could be used.

The restricting apparatus 10 prevents clogging of particles which can be, for instance, teflon particles originating from pump or valve seals or agglomeration of solute particles passing through the restrictor. The restricting apparatus 10 can reduce the pressure of the fluid from 100–680 atmospheres down to 1 atmosphere or less. With flow rates present of 10 microliters/min. to 10 ml/min., such a restricting apparatus 10 is typically a straight fused silica tube with a 20–75 $\mu$m I.D. and is 5–100 cm. in length. This type of restricting apparatus 10 is ideally suited for analytical scale supercritical fluid extraction and for supercritical fluid chromatography. Smaller sized restricting apparatuses 10, typically 1–2 centimeters, allows them to fit into a much smaller space than previously known.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for restricting the flow of supercritical fluid comprising:
a tubular member having a channel, said tubular member having a first portion in which said channel has a first cross sectional area, a second portion restricting the flow of supercritical fluid at a pressure between 100–680 atmospheres to a flow having pressure below supercritical pressure, said second portion defined by a reproducible deformity in the channel such that the channel has a second cross sectional area which is smaller than the first cross sectional area of the first portion, and a third portion having a third cross sectional area which is greater than the second cross sectional area of the second portion, said first portion having an essentially constant outside diameter and wherein the cross sectional dimensions of the second and third portions of the tubular member are less than or equal to said outside diameter of said first portion, all of said cross sectional dimensions of the second and third portions disposed within a cylindrical envelope having a diameter equal to the diameter of the first portion and extending therefrom, said tubular member comprised of a material having sufficient rigidity to maintain a preferred reproducible permanent deformity in the channel when it is freestanding.

2. An apparatus as described in claim 1 wherein the deformity is defined by a spherical indentation.

3. An apparatus as described in claim 1 wherein the deformity is defined by a plurality of indentations.

4. An apparatus as described in claim 2 wherein the tubular member is comprised of stainless steel, platinum, or plastic.

5. An apparatus as described in claim 4 wherein the first portion is in contact with the second portion and the second portion is in contact with the third portion.

6. An apparatus as described in claim 5 including means for heating the tubular member, said heating means in thermal communication with the tubular member.

7. An apparatus as described in claim 6 wherein the plastic is poly ether ether ketone.

8. An apparatus as described in claim 1 wherein the second cross sectional area has a width less than 0.01 mm.

9. A method of forming a supercritical fluid restrictor comprising the steps of:
placing a tubular member having a channel and a predetermined outside diameter into a fixed relationship with a deforming apparatus;
deforming the tubular member in a reproducible manner such that a cross sectional area of the channel is decreased so flow of supercritical fluid at a pressure between 100–680 atmospheres through said channel is restricted to a flow having pressure below supercritical pressure, the tubular member does not flare and all portions of the tubular member are disposed within a cylindrical envelope defined by said outside diameter; and
removing the tubular member from the deforming apparatus such that a desired deformation remains in the tubular member.

10. A method as described in claim 9 wherein the deforming step includes the step of forcing a shaping member of the deforming apparatus against the tubular member.

11. A method as described in claim 10 wherein the forcing step includes the step of pressing the shaping member against the tubular channel in an adjustable manner.

12. A method as described in claim 11 wherein the shaping member includes a ball bearing.

13. A method as described in claim 11 wherein the shaping member includes a shaped head.

14. A method as described in claim 13 wherein the shaping member is screwed past a point of desired fluid restriction such that when the shaping member is released from the tubular member, the elasticity of the tubular member causes the channel of the second portion to open such that the desired level of fluid restriction is achieved.

15. A method as described in claim 14 including before the deforming step, the steps of establishing a flow of fluid through the channel of the tubular member; and monitoring the flow of fluid through the tubular member.

16. A method as described in claim 13 wherein the shaped head has a diameter no greater than half the diameter of the tubing so essentially no flaring occurs to the tubular member during the deforming step.

17. A method of restricting the flow of supercritical fluid comprising the steps of:
placing a tubular member having a channel into a fixed relationship with a deforming apparatus having a shaping member such that the shaping member can adjustably contact and release from the tubular member;
establishing a flow of fluid through the channel of the tubular member; and
deforming the tubular member with the deforming apparatus in a reproducible manner such that a cross sectional area of the channel is decreased so flow of supercritical fluid through said channel is restricted a desired amount, said supercritical fluid having a pressure of 100–680 atmospheres on a first side of the cross-sectional area.

18. A method as described in claim 17 wherein after the establishing step, there is the step of heating the tubular member; and including after the deforming step, there is the step of adjustably releasing the deforming apparatus from the tubular member such that the cross sectional area of the channel is increased due to the elastic properties of the tubular member.

19. A method as described in claim 18 wherein the deforming step includes the step of deforming the tubular member such that it does not flare; and wherein the tubular member has a predetermined outside diameter and all portions of the tubular member are disposed within a cylindrical envelope defined by said outside diameter.

20. A method as described in claim 19 wherein the flow rate of the fluid is between 10 microliters/min. to 10 ml/min.

21. A method as described in claim 20 wherein the tubular member is made of stainless steel, platinum or plastic.

22. A method as described in claim 21 wherein the plastic is poly ether ether ketone.

23. A method as described in claim 22 wherein before the establishing step, there is the step of mixing a modifier into the fluid.

24. A method as described in claim 23 wherein the fluid is $CO_2$ and the modifier is selected from a group of organic solvents consisting of methanol, ethanol, polypropylene carbonate and formic acid.

25. A method as described in claim 17 wherein the establishing step includes the step of establishing a flow of fluid in a supercritical fluid chromatograph or a supercritical fluid extraction system.

26. A method as described in claim 25 wherein the deforming step includes the step of deforming the tubular member such that the flow of fluid is restricted to a flow rate between 10 microliters/min. to 10 milliliters/min.

27. A method as described in claim 17 including after the deforming step, there is the step of releasing the shaping member from the tubular member.

28. A method as described in claim 18 wherein the heating step includes the step of heating the tubular member to between 50° C. and 250° C.

29. An apparatus for restricting the flow of fluid comprising:
a tubular member having a channel, said tubular member having a first portion in which said channel has a first cross sectional area, a second portion for restricting the flow of fluid defined by a reproducible deformity in the channel such that the channel has a second cross sectional area which is smaller than the first cross sectional area of the first portion, and a third portion having a third cross sectional area which is greater than the second cross sectional area of the second portion, said first portion having an essentially constant outside diameter and wherein the cross sectional dimensions of the second and third portions of the tubular member are less than or equal to said outside diameter of said first portion, all of said cross sectional dimensions of the second and third portions disposed within a cylindrical envelope having a diameter equal to the diameter of the first portion and extending therefrom and wherein the first portion is in contact with the second portion and the second portion is in contact with the third portion, said deformity defined by a spherical indentation, said tubular member comprised of stainless steel, platinum or plastic; and
means for heating the tubular member, said heating means in thermal communication with the tubular member.

30. An apparatus as described in claim 29 wherein the plastic is poly ether ether ketone.

31. A method of restricting the flow of supercritical fluid comprising the steps of:
placing a tubular member having a channel into a fixed relationship with a deforming apparatus, said tubular member having elastic properties;
mixing a modifier into the supercritical fluid;
establishing a flow of fluid through the channel of the tubular member; and
deforming the tubular member with the deforming apparatus in a reproducible manner such that a cross sectional area of the channel is decreased so flow of supercritical fluid through said channel is restricted a desired amount, said supercritical fluid having a pressure of 100–680 atmospheres on a first side of the cross-sectional area.

32. A method as described in claim 31 wherein the fluid is $CO_2$ and the modifier is selected from a group of organic solvents consisting of methanol, ethanol, polypropylene carbonate and formic acid.

33. A method as described in claim 32 wherein the tubular member is made of stainless steel, platinum or plastic.

34. A method as described in claim 33 wherein the plastic is poly ether ether ketone.

35. A method of forming a fluid restrictor comprising the steps of:
placing a tubular member having a channel into a fixed relationship with a deforming apparatus; and
deforming the tubular member in a reproducible manner by forcing a ball bearing of the deforming apparatus against the tubular member in an adjustable manner such that a cross sectional area of the channel is decreased so flow of fluid through said channel is restricted a desired amount and the tubular member does not flare.

36. An apparatus for restricting the flow of fluid comprising:
a tubular member having a channel, said tubular member having a first portion in which said channel has a first cross sectional area, a second portion for restricting the flow of fluid defined by a reproducible deformity in the channel such that the channel has a second cross sectional area which has a width less than 0.01 mm and is smaller than the first cross sectional area of the first portion, and a third portion having a third cross sectional area which is greater than the second cross sectional area of the second portion, said first portion having an essentially constant outside diameter and wherein the cross sectional dimensions of the second and third portions of the tubular member are less than or equal to said outside diameter of said first portion, all of said cross sectional dimensions of the second and third portions disposed within a cylindrical envelope having a diameter equal to the diameter of the first portion and extending therefrom, said tubular member comprised of a material having sufficient rigidity to maintain a preferred reproducible permanent deformity in the channel when it is freestanding.

* * * * *